United States Patent
Lee et al.

(10) Patent No.: US 8,619,590 B2
(45) Date of Patent: Dec. 31, 2013

(54) METHOD FOR TRANSMITTING OAM MESSAGE AND PROCESSING ERROR IN PON SYSTEM

(75) Inventors: Young Suk Lee, Gwangju (KR); Hark Yoo, Gwangju (KR); Geun Yong Kim, Gyeonggi-do (KR); Dong Soo Lee, Gwangju (KR); Sung Chang Kim, Gwangju (KR); Mun Seob Lee, Daejeon (KR); Jong Deog Kim, Daejeon (KR); Jai Sang Koh, Deajeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 139 days.

(21) Appl. No.: 13/224,883

(22) Filed: Sep. 2, 2011

(65) Prior Publication Data
US 2012/0163799 A1     Jun. 28, 2012

(30) Foreign Application Priority Data
Dec. 27, 2010 (KR) .................. 10-2010-0135773

(51) Int. Cl.
*H04L 12/26* (2006.01)
(52) U.S. Cl.
USPC ............................................ 370/241.1
(58) Field of Classification Search
None
See application file for complete search history.

(56) References Cited

U.S. PATENT DOCUMENTS

| | | | |
|---|---|---|---|
| 2004/0218534 A1* | 11/2004 | Song et al. | 370/236.2 |
| 2006/0228113 A1* | 10/2006 | Cutillo et al. | 398/71 |
| 2007/0263656 A1* | 11/2007 | Niu et al. | 370/465 |
| 2007/0274341 A1 | 11/2007 | Rodriguez | |
| 2009/0109972 A1* | 4/2009 | Chen | 370/390 |
| 2009/0304385 A1* | 12/2009 | Khermosh | 398/58 |
| 2010/0021158 A1* | 1/2010 | Kanno et al. | 398/27 |
| 2010/0183030 A1* | 7/2010 | Lou et al. | 370/474 |
| 2011/0029773 A1* | 2/2011 | Effenberger | 713/168 |
| 2011/0142437 A1* | 6/2011 | Luo et al. | 398/1 |
| 2011/0211827 A1* | 9/2011 | Soto et al. | 398/25 |
| 2011/0268435 A1* | 11/2011 | Mizutani et al. | 398/5 |
| 2012/0121265 A1* | 5/2012 | Suvakovic et al. | 398/66 |

FOREIGN PATENT DOCUMENTS

KR     10-0825754     4/2008

OTHER PUBLICATIONS

Effengerger, Frank, "Proposed agenda for Munich interim meeting," Rapporteur, Q2/15 (2010).

* cited by examiner

*Primary Examiner* — Otis L Thompson, Jr.
(74) *Attorney, Agent, or Firm* — Nelson Mullins Riley & Scarborough LLP; Anthony A. Laurentano, Esq.; John S. Curran, Esq.

(57) ABSTRACT

A method of transmitting an Operations, Administration and Maintenance (OAM) message and of processing an error in a Passive Optical Network (PON) system is provided. Using an OAM packet format that may be used in common in the PON system, a process of transmitting or receiving an OAM message may be simplified, an efficiency of the process may be increased, and an Optical Network Unit (ONU) may be managed at a high speed.

11 Claims, 8 Drawing Sheets

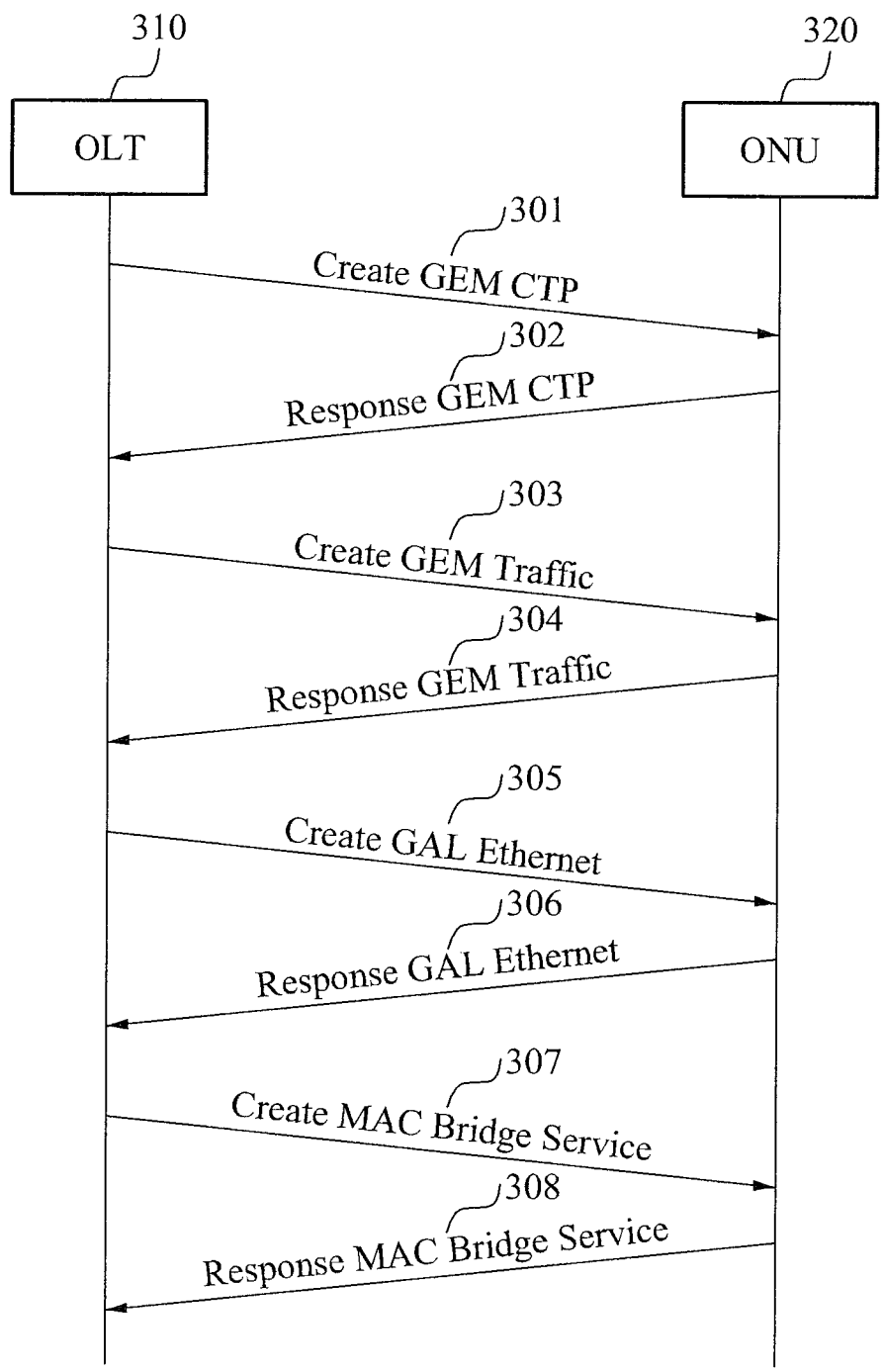

FIG. 4

401 — | Transaction ID (2 byte) | Message Type (1 byte) -Create- | Device ID (1 byte) | Message ID (4 byte) -GEM CTP- | 0 (32 byte) | OMCI Trailer (8 byte) |

402 — | Transaction ID (2 byte) | Message Type (1 byte) -Response- | Device ID (1 byte) | Message ID (4 byte) -GEM CTP- | 0 (32 byte) | OMCI Trailer (8 byte) |

411 — | Transaction ID (2 byte) | Message Type (1 byte) -Create- | Device ID (1 byte) | Message ID (4 byte) -GEM CTP- | Message Contents Length (2 byte) | CRC (4 byte) |

412 — | Transaction ID (2 byte) | Message Type (1 byte) -Response- | Device ID (1 byte) | Message ID (4 byte) -GEM CTP- | Message Contents Length (2 byte) | CRC (4 byte) |

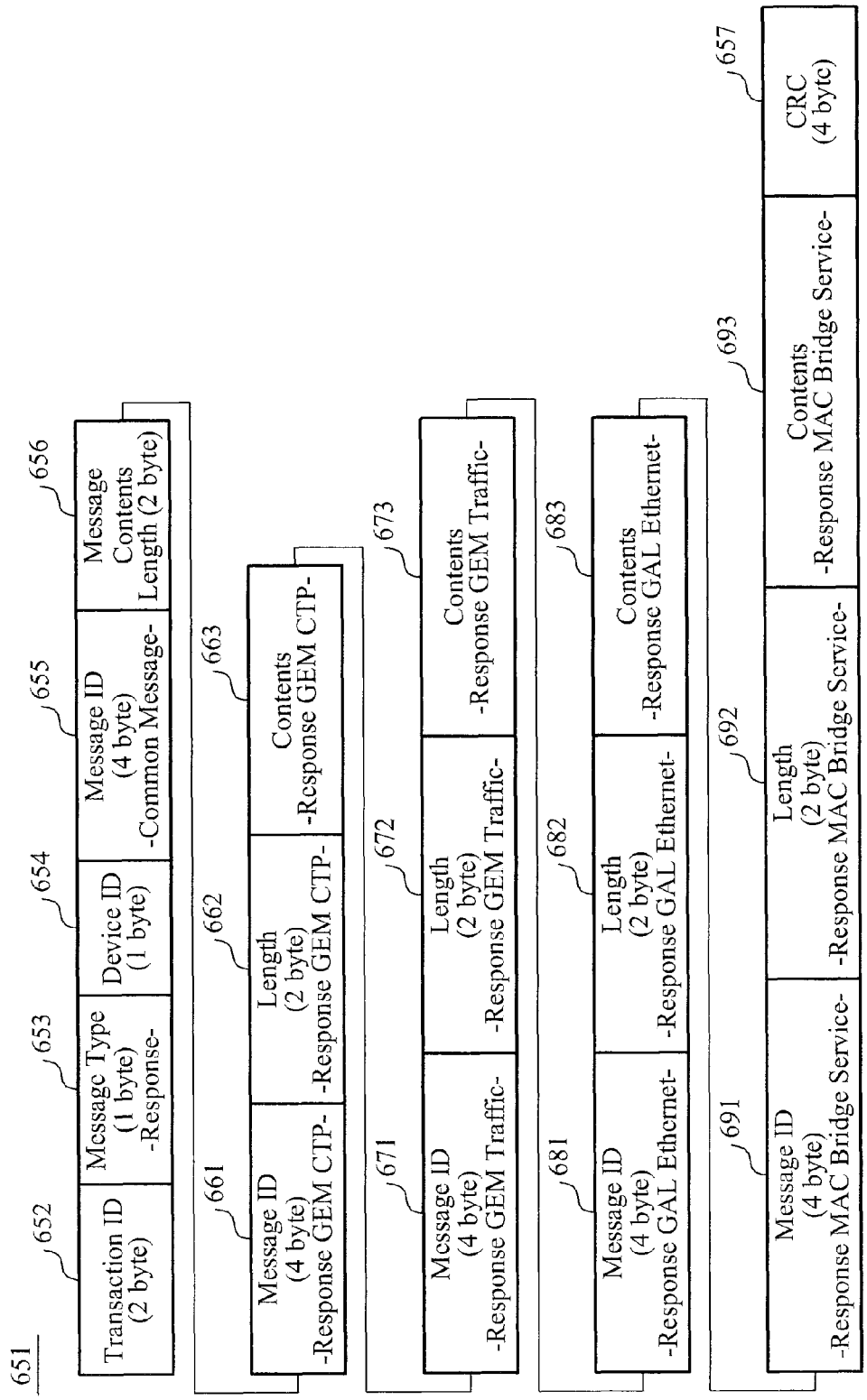

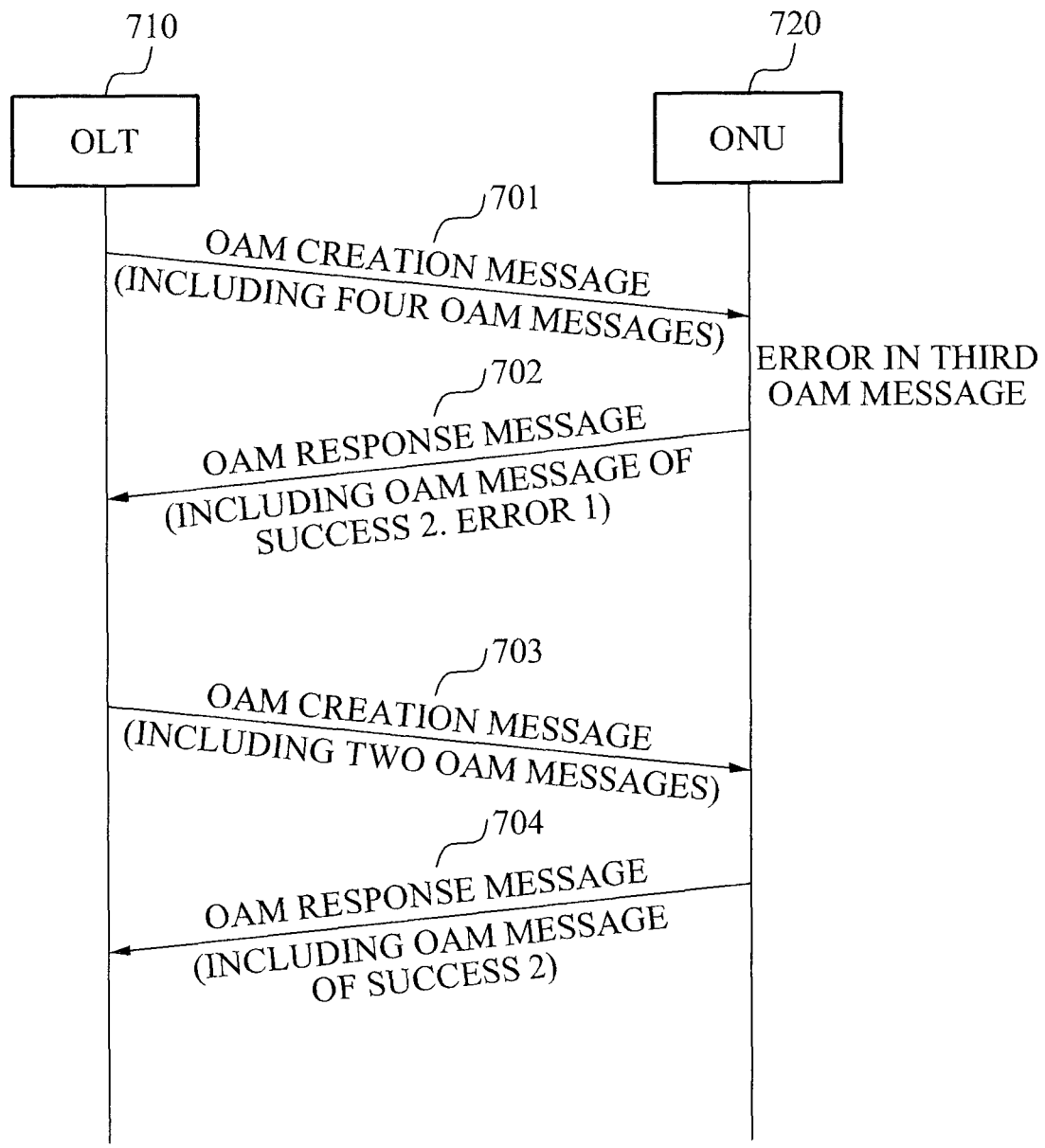

METHOD FOR TRANSMITTING OAM MESSAGE AND PROCESSING ERROR IN PON SYSTEM

CROSS-REFERENCE TO RELATED APPLICATION

This application claims the benefit of Korean Patent Application No. 10-2010-0135773, filed on Dec. 27, 2010, in the Korean Intellectual Property Office, the disclosure of which is incorporated herein by reference.

TECHNICAL FIELD

Embodiments of the present invention relate to a method of transmitting an Operations, Administration and Maintenance (OAM) message in a Passive Optical Network (PON) system, and a method of processing an error of an OAM message.

BACKGROUND ART

In the International Telecommunications Union-Telecommunication Standardization Sector (ITU-T) that currently standardizes Operations, Administration and Maintenance (OAM) of a next-generation Passive Optical Network (PON) system, G.988 (namely, a common Optical Network Unit Management and Control Interface (OMCI)) is being standardized as a next version of G.984.4, namely an existing OAM standard. In particular, G.988 may define OAM that may be used in common in the Gigabit PON (GPON) and the Ethernet PON (EPON). In the G.988 standard, an OAM packet with a fixed size of 53 bytes used in G.984.4 may be changed to have a variable packet length up to 1980 bytes, so that an OAM message may be transmitted and/or received.

However, in G.988, a packet transmission and reception rule of using an OMCI message of a fixed size that has been used in G.984.4 is applied without any change, and accordingly there is only a difference in that an OAM message with a variable length is simply transmitted.

Accordingly, since an OAM packet that may be transmitted up to 1980 bytes is used within '48±α' bytes despite using a variable length applied to G.988, actually there is no efficiency obtained by applying the variable length. Additionally, since a similar number of OAM packets is transmitted or received during activation of an Optical Line Terminal (OLT) and an Optical Network Unit (ONU), there is actually no difference in time due to the activation of the OLT and the ONU.

For example, in a difference in transmission rate based on a windows size of a Transmission Control Protocol (TCP) transmission mechanism that is being used in the Internet, the transmission rate may increase as the windows size increases. Accordingly, in G.988, it is possible to increase a transmission rate and efficiency, by exchanging OAM messages using the entire 1980 bytes, rather than exchanging OAM messages within '48±α' bytes.

DISCLOSURE OF THE INVENTION

Subjects to be Solved by the Invention

An aspect of embodiments of the present invention is to simplify a process of transmitting or receiving an Operations, Administration and Maintenance (OAM) message, to increase an efficiency of the process, and to manage an Optical Network Unit (ONU) at a high speed, by using an OAM packet format that has a variable length and that may be used in common in a Passive Optical Network (PON) system.

Solutions to Solve the Subjects

According to an aspect of the present invention, there is provided a method of transmitting an Operations, Administration and Maintenance (OAM) message in a Passive Optical Network (PON) system, including: transmitting a create OAM message to an Optical Network Unit (ONU); and receiving a response OAM message from the ONU, wherein the create OAM message comprises a message identifier (ID) field, a message contents length field, and a message contents field that are associated with at least one Ethernet switch control creation message, and wherein the response OAM message comprises a message ID field, a message contents length field, and a message contents field that are associated with at least one Ethernet switch control response message.

According to another aspect of the present invention, there is provided a method of transmitting an OAM message in a PON system, including: receiving a create OAM message from an Optical Line Terminal (OLT); and transmitting a response OAM message to the OLT, wherein the create OAM message comprises a message ID field, a message contents length field, and a message contents field that are associated with at least one Ethernet switch control creation message, and wherein the response OAM message comprises a message ID field, a message contents length field, and a message contents field that are associated with at least one Ethernet switch control response message.

According to still another aspect of the present invention, there is provided a method of processing an error of an OAM message in a PON system, including: transmitting an OAM creation message to an ONU, the OAM creation message including a plurality of OAM messages; receiving an OAM response message from the ONU, when the error occurs in an OAM message among the plurality of OAM messages, the OAM response message being associated with a completely processed OAM message among the plurality of OAM messages and a result of processing the OAM message with the error among the plurality of OAM messages; and transmitting an OAM creation message to the ONU, the OAM creation message including a non-processed OAM message following the OAM message with the error among the plurality of OAM messages.

According to yet another aspect of the present invention, there is provided a method of processing an error of an OAM message in a PON system, including: receiving an OAM creation message from an OLT, the OAM creation message including a plurality of OAM messages; processing the plurality of OAM messages, and when the error occurs in an OAM message among the plurality of OAM messages during the processing, transmitting an OAM response message to the OLT, the OAM response message being associated with a completely processed OAM message among the plurality of OAM messages and a result of processing the OAM message with the error among the plurality of OAM messages; receiving an OAM creation message from the OLT, the OAM creation message including a non-processed OAM message following the OAM message with the error among the plurality of OAM messages; and processing the OAM message with the error and the non-processed OAM message, and transmitting, to the OLT, an OAM response message associated with the processed OAM messages.

Effect of the Invention

According to embodiments of the present invention, it is possible to simplify a process of transmitting or receiving an Operations, Administration and Maintenance (OAM) message, to increase an efficiency of the process, and to manage an Optical Network Unit (ONU) at a high speed, by using an OAM packet format that has a variable length and that may be used in common in a Passive Optical Network (PON) system.

BRIEF DESCRIPTION OF THE DRAWING

FIG. 3 is a diagram illustrating an OAM message exchange process in the conventional GPON system.

FIG. 4 is a diagram illustrating OAM packet formats for a create GPON Encapsulation Method (GEM) CTP message and a response GEM CTP message in the conventional GPON system.

FIGS. 6A and 6B are diagrams illustrating packet formats of OAM messages according to an embodiment of the present invention.

FIG. 7 is a flowchart illustrating a method of processing an error of an OAM message in a PON system according to an embodiment of the present invention.

DETAILED DESCRIPTION FOR CARRYING OUT THE INVENTION

Figure 1:
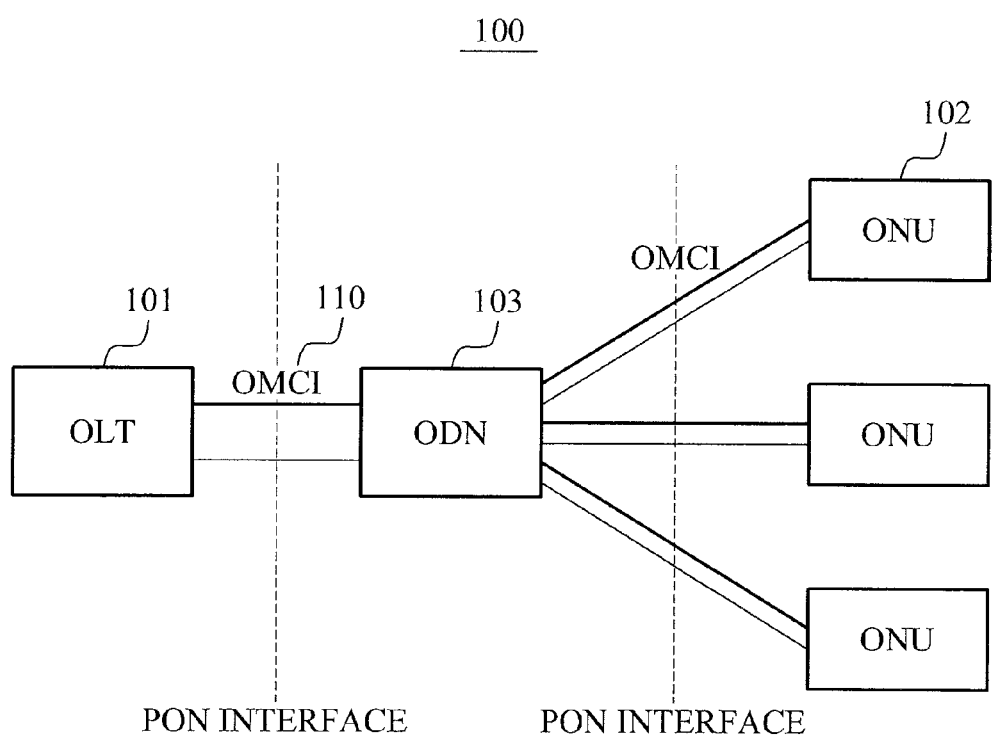
FIG. 1 is a diagram illustrating a configuration of a conventional Gigabit Passive Optical Network (GPON) system.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a conventional Gigabit Passive Optical Network (GPON) system.

Referring to FIG. 1, a conventional GPON system 100 includes an Optical Line Terminal (OLT) 101, an Optical Distribution Network (ODN) 103, and at least one Optical Network Unit (ONU) 102. The International Telecommunications Union-Telecommunication Standardization Sector (ITU-T) G.984.4 standard, or G.988 standard may be applied to the conventional GPON system 100.

The OLT 101 may access the at least one ONU 102 through the ODN 103.

Additionally, an ONU Management and Control Interface (OMCI) 110 may be used as an interface to control the OLT 101 and the ONU 102.

Figure 2:
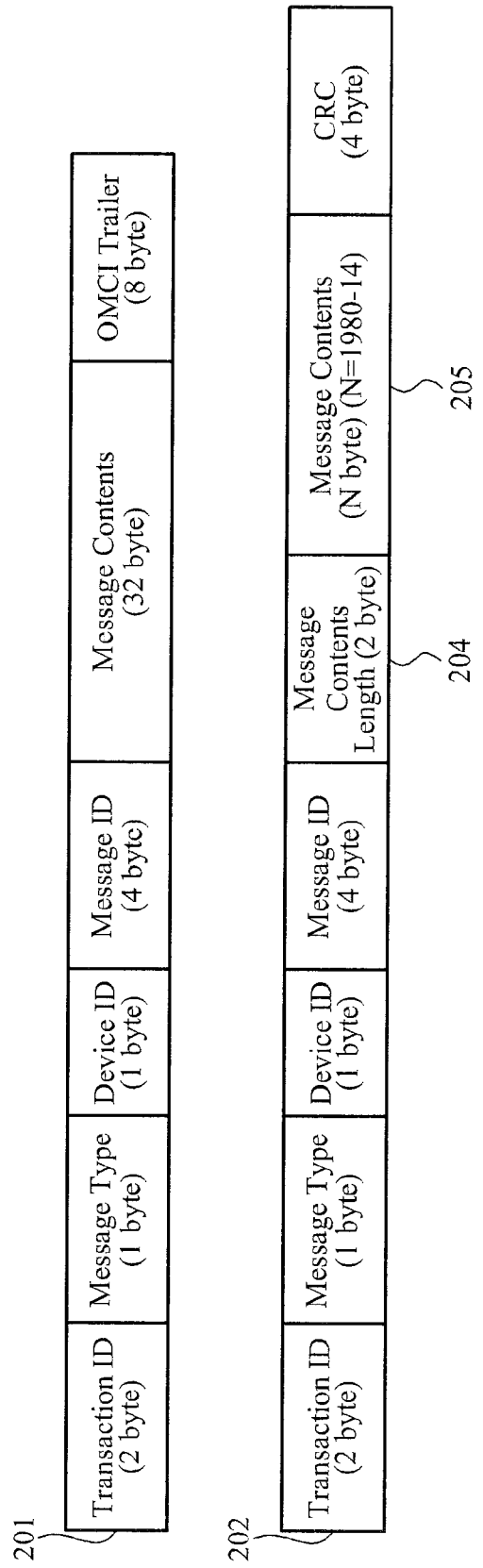
FIG. 2 is a diagram illustrating an Operations, Administration and Maintenance (OAM) packet format conforming to the International Telecommunications Union-Telecommunication Standardization Sector (ITU-T) G.984.4 standard, and an OAM packet format conforming to the G.988 standard, in the conventional GPON system.

FIG. 2 is a diagram illustrating an OAM packet format conforming to the ITU-T G.984.4 standard, and an OAM packet format conforming to the G.988 standard in the conventional GPON system.

Referring to FIG. 2, comparing an OAM packet format 201 conforming to the ITU-T G.984.4 standard with an OAM packet format 202 conforming to the ITU-T G.988 standard in the conventional GPON system, a message contents field 205 of the OAM packet format 201 conforming to the G.984.4 standard may have a variable length up to 1966 bytes. Additionally, the OAM packet format 201 conforming to the G.984.4 standard may further include a message contents length field 204. The message contents length field 204 may include information regarding a size of the message contents field 205.

FIG. 3 is a diagram illustrating an OAM message exchange process in the conventional GPON system.

FIG. 4 is a diagram illustrating OAM packet formats for a create GPON Encapsulation Method (GEM) CTP message and a response GEM CTP message in the conventional GPON system.

Referring to FIGS. 3 and 4, the conventional GPON system to which the ITU-T G.984.4 standard or G.988 standard is applied may perform a process of transmitting or receiving OAM messages to assign a port-ID of an ONU 320.

An OLT 310 may transmit a create GEM CTP message 301 to the ONU 320, and the ONU 320 may transmit a response GEM CTP message 302 to the OLT 310.

Additionally, the OLT 310 may transmit a create GEM traffic message 303 to the ONU 320, and the ONU 320 may transmit the response GEM CTP message 302 to the OLT 310.

Furthermore, the OLT 310 may transmit a create GAL Ethernet message 305 to the ONU 320, and the ONU 320 may transmit a response GAL Ethernet message 306 to the OLT 310.

Moreover, the OLT 310 may transmit a create Media Access Control (MAC) bridge service message 303 to the ONU 320, and the ONU 320 may transmit the response GEM CTP message 302 to the OLT 310.

In a conventional GPON system conforming to the ITU-T G.984.4 standard, the create GEM CTP message 301 may have an OAM packet format 401, and the response GEM CTP message 302 may have an OAM packet format 402.

Additionally, in a conventional GPON system conforming to the ITU-T G.988 standard, the create GEM CTP message 301 may have an OAM packet format 411, and the response GEM CTP message 302 may have an OAM packet format 412.

As described with reference to FIGS. 2 through 4, since the OAM packet formats 411 and 412 conforming to the G.988 standard each include a message contents field of a variable length, it may be efficient to use the create GEM CTP message 301 and the response GEM CTP message 302 that respectively have the OAM packet formats 411 and 412 conforming to the G.988 standard.

However, as shown in FIG. 3, an operation of activating the OLT 310 and the ONU 320 in the GPON system may be performed through a process of transmitting or receiving a large amount of OAM messages between the OLT 310 and the ONU 320. In an example of ONU equipment equipped with a 24-port switch, OAM messages may be exchanged at least 100 times.

Actually, an OAM packet format conforming to the G.988 standard is not used more efficiently than an OAM packet format conforming to the G.984.4 standard. Specifically, the OAM packet format conforming to the G.988 standard may have a packet size up to 1980 bytes. However, since a packet having a size less than 48 bytes is actually transmitted a plurality of times, the OAM packet format may have the same effect as if a window size of a Transmission Control Protocol (TCP) is set to a minimum value and the OAM packet format is transmitted. In the G.988 standard, a maximum size of an OAM creation packet is set to 34 bytes due to standard compatibility with the G.984.4 standard. Accordingly, an OAM creation packet conforming to the G.988 standard may have a size of 48 bytes obtained by adding 34 bytes to 14 bytes (namely, a size of a header).

Thus, to efficiently use an OAM message conforming to the G.988 standard, there is a need for a new scheme of efficiently using 1980 bytes of the OAM message conforming to the G.988 standard so as to have the same effect as if the window size of the TCP is set to be large.

Figure 5:
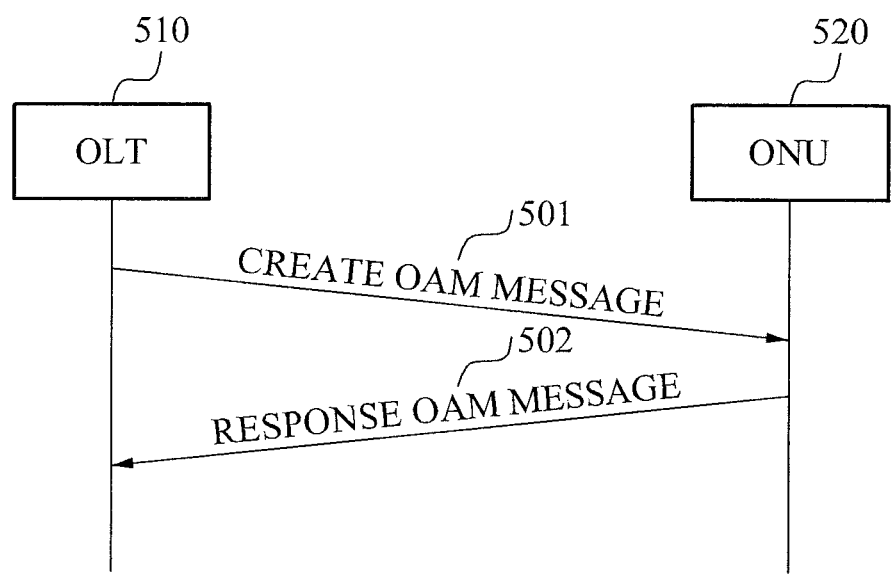
FIG. 5 is a flowchart illustrating a method of transmitting an OAM message in a PON system according to an embodiment of the present invention.

FIG. 5 is a flowchart illustrating a method of transmitting an OAM message in a PON system according to an embodiment of the present invention.

Figure 6A:
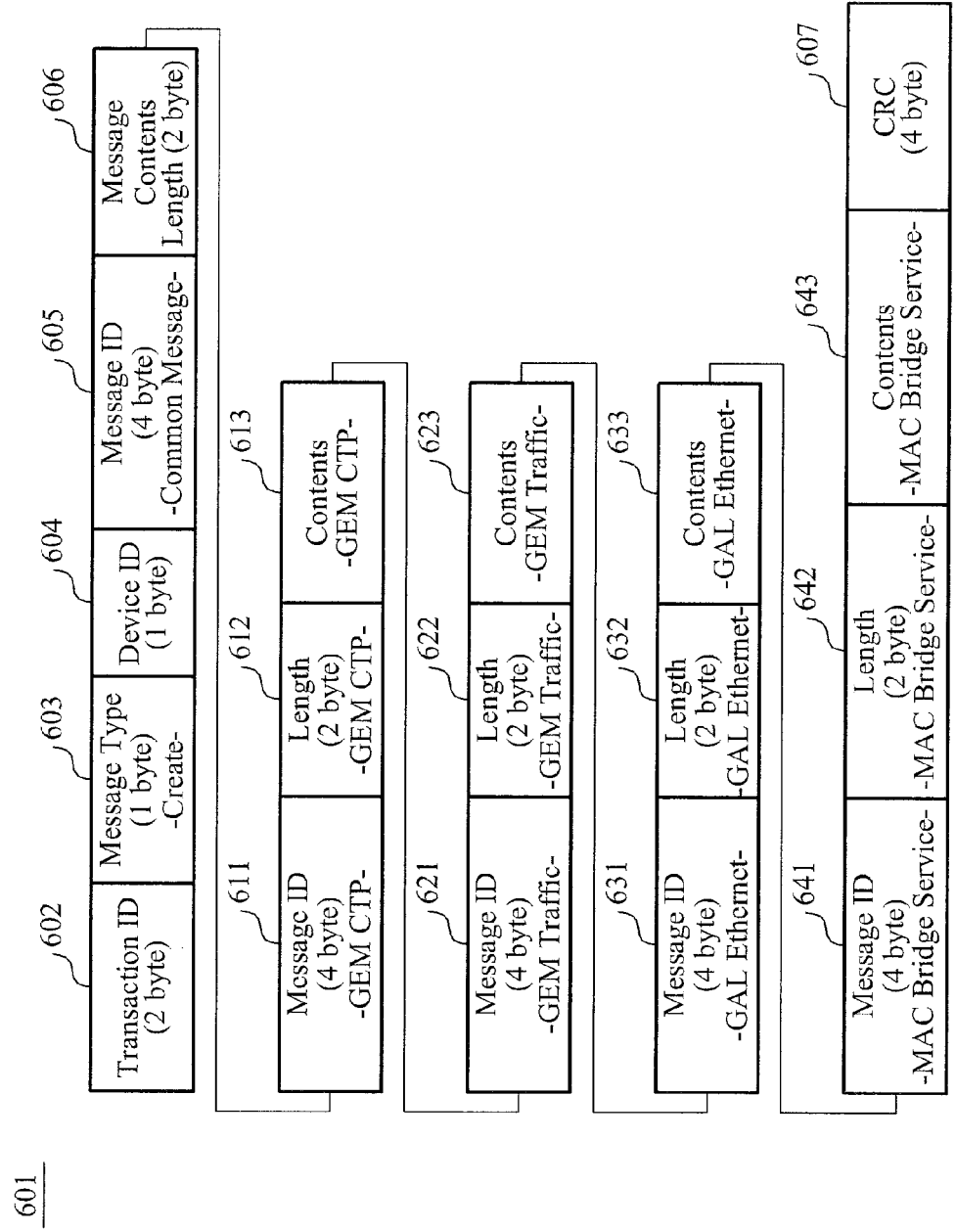

FIGS. 6A and 6B are diagrams illustrating packet formats of OAM messages according to an embodiment of the present invention.

Referring to FIGS. 5, 6A and 6B, in operation 501, an OLT 510 may transmit a create OAM message to an ONU 520.

The create OAM message may include a message ID field, a message contents length field, and a message contents field that are associated with at least one Ethernet switch control creation message.

The Ethernet switch control creation message may include at least one of a create GEM CTP message, a create GEM traffic message, a create GAL Ethernet message, and a create MAC bridge service message.

An OAM packet format 601 may refer to a packet format of a create OAM message according to an embodiment.

The OAM packet format 601 may use a header portion of an OAM packet format conforming to the ITU-T G.988 standard. In other words, a header portion of the OAM packet format 601 may include a transaction ID field 602, a message type field 603, a device ID field 604, a message ID field 607, and a message contents length field 606.

The OAM packet format 601 may include a message ID field 611, a message contents length field 612, and a message contents field 613 that are associated with a create GEM CTP message, following the header portion.

Additionally, the OAM packet format 601 may include a message ID field 621, a message contents length field 622, and a message contents field 623 that are associated with a create GEM traffic message.

Furthermore, the OAM packet format 601 may include a message ID field 631, a message contents length field 632, and a message contents field 633 that are associated with a create GAL Ethernet message.

Moreover, the OAM packet format 601 may include a message ID field 641, a message contents length field 642, and a message contents field 643 that are associated with a create MAC bridge service message.

The OAM packet format 601 may include a Cyclical Redundancy Check (CRC) field 607. The CRC field 607 may include a CRC code for the entire create OAM message of the OAM packet format 601.

According to an aspect of the present invention, types of messages used in OAM may include a create message, a delete message, a get message, and a set message. The OAM packet format 601 may be applied to all the create message, the delete message, the get message, and the set message as OAM messages. Here, a factor indicating a type of an OAM message may be included in the message type field 603. In other words, the message type field 603 may include a factor indicating a type of an OAM message.

For example, a delete OAM message may include a message ID field, a message contents length field, and a message contents field, for each of a delete GEM CTP message, a delete GEM traffic message, a delete GAL Ethernet message, and a delete MAC bridge service message. Additionally, a get OAM message may include a message ID field, a message contents length field, and a message contents field, for each of a get GEM CTP message, a get GEM traffic message, a get GAL Ethernet message, and a get MAC bridge service message. Furthermore, a set OAM message may include a message ID field, a message contents length field, and a message contents field, for each of a set GEM CTP message, a set GEM traffic message, a set GAL Ethernet message, and a set MAC bridge service message.

In operation 502, the ONU 520 may transmit a response OAM message to the OLT 510. In other words, the OLT 510 may receive the response OAM message from the ONU 520.

The response OAM message may include a message ID field, a message contents length field, and a message contents field that are associated with at least one Ethernet switch control response message.

The Ethernet switch control response message may include at least one of a response GEM CTP message, a response GEM traffic message, a response GAL Ethernet message, and a response MAC bridge service message.

An OAM packet format 651 may refer to a packet format of a response OAM message according to an embodiment.

The OAM packet format 651 may use a header portion of an OAM packet format conforming to the ITU-T G.988 standard. In other words, a header portion of the OAM packet format 651 may include a transaction ID field 652, a message type field 653, a device ID field 654, a message ID field 657, and a message contents length field 656.

The OAM packet format 651 may include a message ID field 661, a message contents length field 662, and a message contents field 663 that are associated with a response GEM CTP message, following the header portion.

Additionally, the OAM packet format 651 may include a message ID field 671, a message contents length field 672, and a message contents field 678 that are associated with a response GEM traffic message.

Furthermore, the OAM packet format 651 may include a message ID field 681, a message contents length field 682, and a message contents field 683 that are associated with a response GAL Ethernet message.

Moreover, the OAM packet format 651 may include a message ID field 691, a message contents length field 692, and a message contents field 693 that are associated with a response MAC bridge service message.

The OAM packet format 651 may include a CRC field 657. The CRC field 657 may include a CRC code for the entire response OAM message of the OAM packet format 651.

As described with reference to FIGS. 5, 6A and 6B, in the method of transmitting an OAM message in the PON system according to an embodiment of the present invention, a single OAM message and a single response message may be transmitted and received, unlike the method of FIG. 3 of transmitting an OAM message in the convention GPON system conforming to the ITU-T G.984.4 standard or G.988 standard. Accordingly, using an OAM packet format in the method of transmitting an OAM message in the PON system according to an embodiment of the present invention, it is possible to increase a number of packets to be transmitted, and to effectively use an OAM message that conforms to the G.988 standard and that has a size up to 1980 bytes.

FIG. 7 is a flowchart illustrating a method of processing an error of an OAM message in a PON system according to an embodiment of the present invention.

Referring to FIG. 7, in operation 701, an OLT 710 may transmit, to an ONU 720, an OAM creation message including a plurality of OAM messages.

For example, an OAM creation message including four OAM messages may be transmitted from the OLT 701 to the ONU 720.

The ONU 720 may process the plurality of received OAM messages. When an error occurs in an OAM message among the plurality of OAM messages, the ONU 720 may transmit, to the OLT 710, an OAM response message that is associated with a completely processed OAM message and with a result of processing the OAM message with the error in operation 702. In other words, upon occurrence of an error in an OAM message among the OAM messages, the OLT 710 may receive, from the ONU 720, an OAM response message that is associated with a completely processed OAM message and with a result of processing the OAM message with the error.

For example, when an error occurs in a third OAM message while the ONU 720 processes four OAM messages, the ONU 720 may transmit, to the OLT 710, an OAM response message that is associated with a first OAM message and a second OAM message that are completely processed, and with a result of processing the third OAM message with the error.

The OLT 710 may detect occurrence of the error, based on the received OAM response message. In operation 703, the OLT 710 may transmit, to the ONU 720, an OAM creation message that includes a non-processed OAM message following the OAM message with the error among the plurality of OAM messages.

For example, the OLT 710 may transmit, to the ONU 720, an OAM creation message that includes non-processed OAM messages (namely, the third OAM message and a fourth OAM message) that follows the third OAM message with the error.

The ONU 720 may process the received OAM message with the error, and the non-processed OAM message, and may transmit, to the OLT 710, an OAM response message associated with the completely processed OAM messages in operation 704. In other words, the OLT 710 may receive, from the ONU 720, the OAM response message associated with the completely processed OAM messages.

For example, the ONU 720 may process the third OAM message with the error, and the fourth OAM message that is not processed, and may transmit, to the OLT 710, an OAM response message associated with the third OAM message and the fourth OAM message that are completely processed.

The embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

EXPLANATION OF REFERENCE NUMERALS

100: Conventional Gigabit Passive Optical Network (GPON) system
101: Optical Line Terminal (OLT)
102: Optical Network Unit (ONU)
103: Optical Distribution Network (ODN)
110: ONU Management and Control Interface (OMCI)
301: GPON Encapsulation Method (GEM)
305: GEM Adaptation Layer (GAL)
307: Media Access Control (MAC)

The invention claimed is:

1. A method of transmitting an Operations, Administration and Maintenance (OAM) message in a Passive Optical Network (PON) system, the method comprising:
transmitting a create OAM message to an Optical Network Unit (ONU); and
receiving a response OAM message from the ONU,
wherein the create OAM message comprises a message identifier (ID) field, a message contents length field, and a message contents field that are associated with at least one Ethernet switch control creation message, the Ethernet switch control creation message capable of being at least one of a create Gigabit-capable Passive Optical Network Encapsulation Method (GEM) Connection Termination Point (CTP) message, a create Gigabit-capable encapsulation method adaption layer (GAL) Ethernet message, and a create Media Access Control (MAC) bridge service message, and
wherein the response OAM message comprises a message ID field, a message contents length field, and a message contents field that are associated with at least one Ethernet switch control response message.

2. The method of claim 1, wherein the Ethernet switch control creation message is capable of being a create GEM traffic message.

3. The method of claim 1, wherein a header portion of the create OAM message comprises a transaction ID field, a message type field, a device ID field, a message ID field, and a message contents length field.

4. The method of claim 1, wherein the create OAM message further comprises a Cyclical Redundancy Check (CRC) field, and
wherein the CRC field comprises a CRC code for the entire create OAM message.

5. The method of claim 1, wherein types of OAM messages comprise a create message, a delete message, a get message, and a set message.

6. The method of claim 5, wherein each of the OAM messages comprises a field indicating a type of each of the OAM messages.

7. The method of claim 1, wherein the Ethernet switch control response message comprises at least one of a response GEM CTP message, a response GEM traffic message, a response GAL Ethernet message, and a response MAC bridge service message.

8. The method of claim 1, wherein a header portion of the response OAM message comprises a transaction ID field, a message type field, a device ID field, a message ID field, and a message contents length field.

9. A method of transmitting an Operations, Administration and Maintenance (OAM) message in a Passive Optical Network (PON) system, the method comprising:

receiving a create OAM message from an Optical Line Terminal (OLT); and transmitting a response OAM message to the OLT, wherein the create OAM message comprises a message identifier (ID) field, a message contents length field, and a message contents field that are associated with at least one Ethernet switch control creation message, the Ethernet switch control creation message capable of being at least one of a create Gigabit-capable Passive Optical Network Encapsulation Method (GEM) Connection Termination Point (CTP) message, a create Gigabit-capable encapsulation method adaption layer (GAL) Ethernet message, and a create Media Access Control (MAC) bridge service message, and wherein the response OAM message comprises a message ID field, a message contents length field, and a message contents field that are associated with at least one Ethernet switch control response message.

10. A method of processing an error of an Operations, Administration and Maintenance (OAM) message in a Passive Optical Network (PON) system, the method comprising:

transmitting an OAM creation message to an Optical Network Unit (ONU), the OAM creation message comprising a plurality of OAM messages;

receiving an OAM response message from the ONU, when the error occurs in an OAM message among the plurality of OAM messages, the OAM response message being associated with a completely processed OAM message among the plurality of OAM messages and a result of processing the OAM message with the error among the plurality of OAM messages; and transmitting an OAM creation message to the ONU, the OAM creation message comprising a non-processed OAM message following the OAM message with the error among the plurality of OAM messages.

11. A method of processing an error of an Operations, Administration and Maintenance (OAM) message in a Passive Optical Network (PON) system, the method comprising:

receiving an OAM creation message from an Optical Line Terminal (OLT), the OAM creation message comprising a plurality of OAM messages;

processing the plurality of OAM messages, and when the error occurs in an OAM message among the plurality of OAM messages during the processing, transmitting an OAM response message to the OLT, the OAM response message being associated with a completely processed OAM message among the plurality of OAM messages and a result of processing the OAM message with the error among the plurality of OAM messages;

receiving an OAM creation message from the OLT, the OAM creation message comprising a non-processed OAM message following the OAM message with the error among the plurality of OAM messages; and processing the OAM message with the error and the non-processed OAM message, and transmitting, to the OLT, an OAM response message associated with the processed OAM messages.

* * * * *

UNITED STATES PATENT AND TRADEMARK OFFICE
CERTIFICATE OF CORRECTION

PATENT NO.         : 8,619,590 B2                          Page 1 of 1
APPLICATION NO.    : 13/224883
DATED              : December 31, 2013
INVENTOR(S)        : Young Suk Lee et al.

It is certified that error appears in the above-identified patent and that said Letters Patent is hereby corrected as shown below:

Title Page, should read,
 (75) Young Suk Lee, Gwangju (KR); Hark Yoo, Gwangju (KR); Geun Yong Kim, Gyeonggi-do (KR); Dong Soo Lee, Gwangju (KR); Sung Chang Kim, Gwangju (KR); Mun Seob Lee, Daejeon (KR); Jong Deog Kim, Daejeon (KR); Jai Sang Koh, Gwangju (KR)

Signed and Sealed this
Eighteenth Day of March, 2014

Michelle K. Lee
*Deputy Director of the United States Patent and Trademark Office*